US009741220B2

(12) United States Patent
Mederos et al.

(10) Patent No.: US 9,741,220 B2
(45) Date of Patent: Aug. 22, 2017

(54) MULTI SPECTRAL DETECTION DEVICE INCLUDING AN ACOUSTIC ARRAY, A PROTECTION SYSTEM, AND RELATED METHODS

(71) Applicant: Orbital ATK, Inc., Plymouth, MN (US)

(72) Inventors: Raymond Mederos, Tampa, FL (US); Jonathan L. Carter, New Port Richey, FL (US); John R. Kenyon, Safety Harbor, FL (US); Jay B. Cleckler, Long Beach, CA (US); Mark E. Walker, Fullerton, CA (US)

(73) Assignee: Orbital ATK, Inc., Plymouth, MN (US)

( * ) Notice: Subject to any disclaimer, the term of this patent is extended or adjusted under 35 U.S.C. 154(b) by 0 days.

(21) Appl. No.: 15/207,256

(22) Filed: Jul. 11, 2016

(65) Prior Publication Data

US 2017/0186288 A1    Jun. 29, 2017

Related U.S. Application Data

(63) Continuation of application No. 13/799,519, filed on Mar. 13, 2013, now Pat. No. 9,400,341.

(51) Int. Cl.
*G01J 5/00*    (2006.01)
*G08B 13/16*    (2006.01)
(Continued)

(52) U.S. Cl.
CPC ........... *G08B 13/1672* (2013.01); *G01V 1/00* (2013.01); *G01V 8/10* (2013.01); *G08B 13/19* (2013.01); *G08B 13/194* (2013.01)

(58) Field of Classification Search
CPC .................................. G01V 1/00; G01V 8/10
(Continued)

(56) References Cited

U.S. PATENT DOCUMENTS 6,621,764 B1 * 9/2003 Smith .................... F41H 11/00
                                                     367/128
7,916,887 B2    3/2011 Cleckler et al.
(Continued)

OTHER PUBLICATIONS

ATK Defense Electronic Systems. AN/AAR-47 Missile Warning System. Date unknown [online] [retrieved on Jul. 18, 2013] Retrieved from the internet: <http://www.atk.com/wp-content/uploads/2012/09/DES-AAR-47-HFI.pdf>, 2 pages.
(Continued)

*Primary Examiner* — David Porta
*Assistant Examiner* — Meenakshi Sahu
(74) *Attorney, Agent, or Firm* — TraskBritt

(57) ABSTRACT

A multi-spectral detection device is provided that includes a housing, a bezel spacer, a microphone, an end cap and electro-optical sensors mounted to the end cap. The housing has an inner chamber that holds sensor components. The bezel spacer has a first end and an opposed, second end. The first end of the bezel spacer extends from a first end of the housing. The bezel spacer has a central bezel passage leading to the inner chamber of the housing. The bezel spacer further has at least four side walls. Each side wall is positioned 90 degrees away from an adjacent side wall. A microphone is coupled to each side wall of the bezel spacer in such a manner that each microphone is faced 90 degrees with respect to an adjacent microphone to form a compact acoustic array. The end cap is coupled to the second end of the bezel spacer and the electro-optical sensors are mounted to the end cap.

20 Claims, 4 Drawing Sheets

(51) Int. Cl.
    *G08B 13/19*     (2006.01)
    *G08B 13/194*     (2006.01)
    *G01V 8/10*     (2006.01)
    *G01V 1/00*     (2006.01)

(58) Field of Classification Search
    USPC .................................................... 250/338.1
    See application file for complete search history.

(56) References Cited

U.S. PATENT DOCUMENTS

| | | |
|---|---|---|
| 8,258,998 B2 | 9/2012 | Factor et al. |
| 9,400,341 B2 * | 7/2016 | Mederos ................. G01V 8/10 |
| 2010/0278347 A1 | 11/2010 | Succi et al. |

OTHER PUBLICATIONS

Wood, "Helicopter Alert and Threat Termination—Acoustic (HALTT-A)," DARPA paper, online] [retrieved on Jul. 18, 2013 from the internet: <http://65.18.194.107/~admin1/images/pdf/Presentations/ASE/2010/ASPF10-OLINGER.pdf>, Nov. 17, 2010, 24 pages.

\* cited by examiner

MULTI SPECTRAL DETECTION DEVICE INCLUDING AN ACOUSTIC ARRAY, A PROTECTION SYSTEM, AND RELATED METHODS

CROSS-REFERENCE TO RELATED APPLICATION

This application is a continuation of U.S. patent application Ser. No. 13/799,519, filed Mar. 13, 2013, now U.S. Pat. No. 9,400,341, issued Jul. 26, 2016, the disclosure of which is hereby incorporated herein in its entirety by this reference.

BACKGROUND

Threat warning systems are incorporated in vehicles, such as military vehicles, to provide warnings of attacks by missiles, laser threats, bullets, and the like. For example, ultraviolet (UV) detectors have been used to detect missiles, visible-near infrared (VIS-NIR) detectors have been used to detect lasers, and acoustic detectors and microphone arrays have been used to detect bullets. Typically, a controller, coupled to receive data from the detectors, applies an algorithm to the data to interpret the threat. Applying the detectors to an object can be a challenge. For example, in applying an acoustic detector system, several detectors are typically spaced relatively far from each other to be able to generate signals that can be used to determine an acoustic threat. Mounting the detectors can be a challenge especially in objects such as aircraft where positioning of the sensors, and providing communication links to the controller are difficult and costly.

For the reasons stated above and for other reasons stated below, which will become apparent to those skilled in the art upon reading and understanding the present specification, there is a need in the art for an efficient and effective multi-spectral detection system that is easy to deploy.

BRIEF SUMMARY

The above-mentioned problems of current systems are addressed by embodiments of the present disclosure and will be understood by reading and studying the following specification. The following summary is made by way of example and not by way of limitation. It is merely provided to aid the reader in understanding some of the aspects of the disclosure.

In one embodiment, a multi-spectral detection device is provided. The multi-spectral device includes a sensor housing, electro-optical sensors and an acoustic array. The sensor housing is configured to be mounted to an object to be protected. The electro-optical sensors are mounted to the sensor housing and the acoustic array is coupled to the sensor housing.

In another embodiment, a multi-spectral detection device is provided. The multi-spectral detection device includes a housing, a bezel spacer, a microphone, an end cap and electro-optical sensors mounted to the end cap. The housing has an inner chamber that holds sensor components. The bezel spacer has a first end and an opposed, second end. The first end of the bezel spacer extends from a first end of the housing. The bezel spacer has a central bezel passage leading to the inner chamber of the housing. The bezel spacer further has at least four side walls. Each side wall is positioned 90 degrees away from an adjacent side wall. A microphone is coupled to each side wall of the bezel spacer in such a manner that each microphone is faced 90 degrees with respect to an adjacent microphone to form a compact acoustic array. The end cap is coupled to the second end of the bezel spacer and the electro-optical sensors are mounted to the end cap.

In still another embodiment, a multi-spectral detection device is provided. The multi-spectral detection device includes a sensor housing, a bezel spacer, a mount cap, electro-optical sensors and an acoustic array. The sensor housing is configured to be mounted to an object to be protected. The sensor housing has an interior chamber, a first end and a second end. The bezel spacer has at least one side wall that extends from the first end of the sensor housing and terminates at a bezel spacer end. The bezel spacer has a central bezel passage that leads toward the interior of the chamber. The at least one side wall includes a plurality of selectively positioned microphone apertures. The mount cap is coupled proximate the bezel spacer end covering the central bezel passage. The mount cap has a plurality of sensor apertures that lead toward the central bezel passage. An electro-optical sensor is mounted in each sensor aperture of the mount cap. In addition, the acoustic array includes a microphone mounted in each microphone aperture of the at least one side wall of the bezel spacer.

BRIEF DESCRIPTION OF THE DRAWINGS

The present disclosure can be more easily understood and further advantages and uses thereof will be more readily apparent, when considered in view of the detailed description and the following figures in which.

In accordance with common practice, the various described features are not drawn to scale but are drawn to emphasize specific features relevant to the present disclosure. Reference characters denote like elements throughout the figures and the specification.

DETAILED DESCRIPTION

In the following detailed description, reference is made to the accompanying drawings, which form a part hereof and in which is shown by way of illustration, specific embodiments in which the disclosure may be practiced. These embodiments are described in sufficient detail to enable those skilled in the art to practice the disclosure, and it is to be understood that other embodiments may be utilized and that changes may be made without departing from the spirit and scope of the present disclosure. The following detailed description is, therefore, not to be taken in a limiting sense, and the scope of the present disclosure is defined only by the claims and equivalents thereof.

Embodiments of the present disclosure provide a multi-spectral detection device that incorporates a compact acoustic array into an electro-optical sensor in a shared aperture arrangement. That is, embodiments integrate an acoustic capability with electro-optical sensors into a single physical container with little perturbation to the physical envelope and no impact to a physical interface with a host platform.

This results in a compact package that preserves much of an electro-optical sensor configuration while orienting the acoustic sensors in a desired arrangement.

Figure 1:
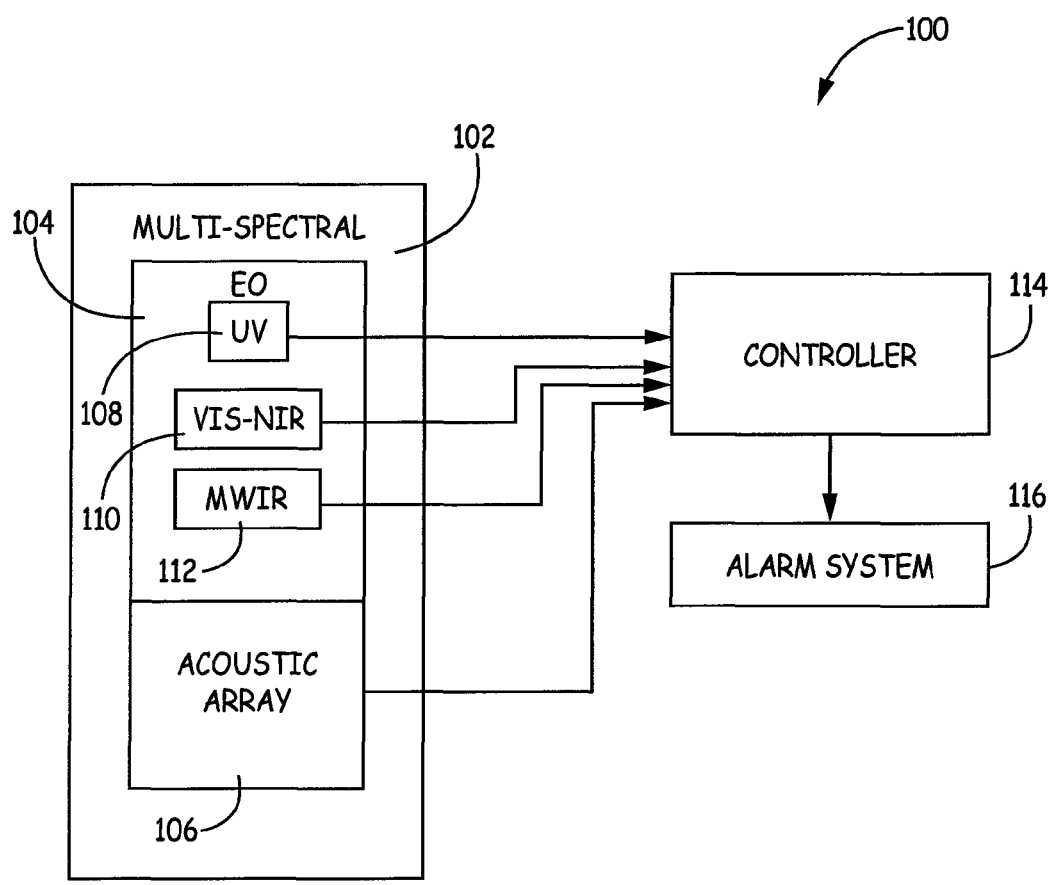
FIG. 1 is a block diagram of a detection system of one embodiment of the present disclosure.

Referring to FIG. 1, a block diagram of a protection system 100 of an embodiment of the present disclosure is provided. The protection system 100 includes a multi-spectral detection system 102, a controller 114 and an alarm system 116. The controller 114 receives signals from the multi-spectral detection system 102. The controller 114 is configured to analyze signals from the multi-spectral detection system 102 and activate the alarm system 116 when the controller 114 has determined that a threat has been detected. That is, in some embodiments, the controller 114 implements algorithms that interpret the signals from the multi-spectral detection system 102 to determine threats. In some embodiments, the multi-spectral detection system 102 includes electro-optical sensors 104 and an acoustic array 106. The acoustic array 106 is attached to a housing that contains the electro-optical sensors 104 as discussed. An acoustic array 106 is used to detect audio signals generated from items such as non-tracer small arms fire and anti-aircraft artillery. The inclusion of the acoustic array 106 significantly enhances hostile fire detection performance, increases the probability of detection, reduces false alarm rates, provides direction of arrival, as well as shooter intent and geo-location information. The electro-optical sensors 104 in this example embodiment include an ultraviolet (UV) sensor 108, a visible-near infrared (VIS-NIR) sensor 110 and a mid-wave infrared (MWIR) sensor 112. It is understood, that more or less, electro-optical sensors can be used in a protection system 100 and the present disclosure is not limited to a set number or type of electro-optical sensor 104.

Figure 2A:
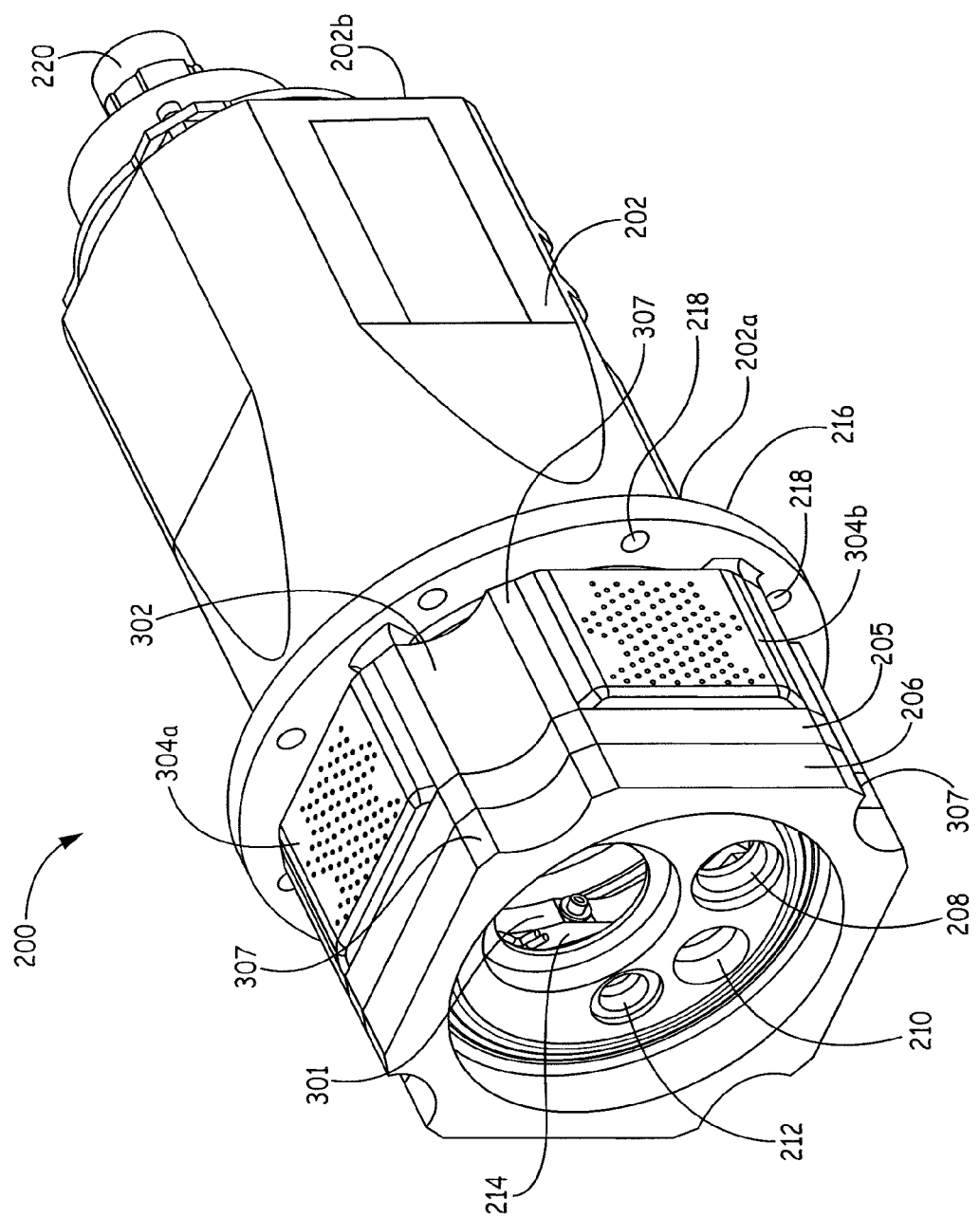
FIG. 2A is a side perspective view of a multi-spectral detecting system of one embodiment of the present disclosure.
Figure 2B:
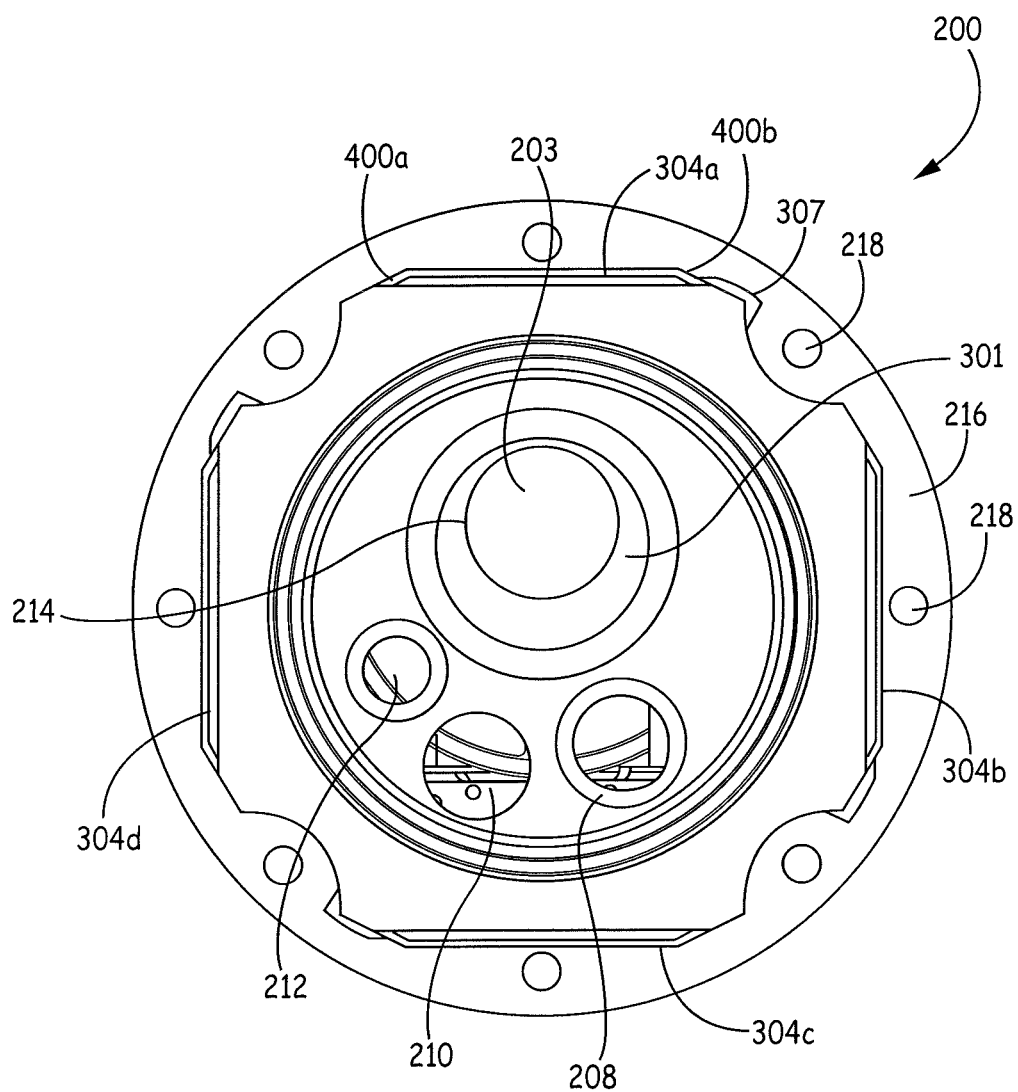
FIG. 2B is a front view of the multi-spectral detecting system of FIG. 2A.

FIG. 2A illustrates a side perspective view of a multi-spectral detection system 200 of an embodiment, and FIG. 2B illustrates a front view of the multi-spectral detection system 200. The detection system 200 may include a sensor housing 202, which may also be characterized as a "can," having an inner chamber 203 in which various sensor components are housed. The sensor housing 202 includes a front end 202a and a back end 202b. Extending from the back end 202b is a back passage assembly 220. The back passage assembly 220 includes a back passage through which communication cables are passed. A flange 216 extends from the front end 202a of the housing 202 in an outward direction. The flange 216 includes a plurality of flange apertures 218 that is used to couple the detection system 200 to the object it is to protect. Further extending from the front end 202a of the sensor housing 202 is a bezel spacer 302. The bezel spacer 302 provides a mounting area for an array of acoustic sensors, as discussed below. As illustrated in FIGS. 2A and 2B, along surfaces of the bezel spacer 302 are mounted wind screens 304a, 304b, 304c, and 304d that cover respective microphones that make up the acoustic array 106, as illustrated in FIG. 1. Coupled to an end of the bezel spacer 302 is mount cap 205 and end cap 206. The mount cap 205 covers a central bezel passage 301. The mount cap 205 further includes a plurality of electro-optical sensor apertures 208, 210, 212 and 214 in which the electro-optical sensors 104 are mounted, as illustrated in FIG. 1. The bezel spacer 302, in an embodiment, includes side walls 307 that are tangent to an outer curvature of the housing 202.

Figure 3:
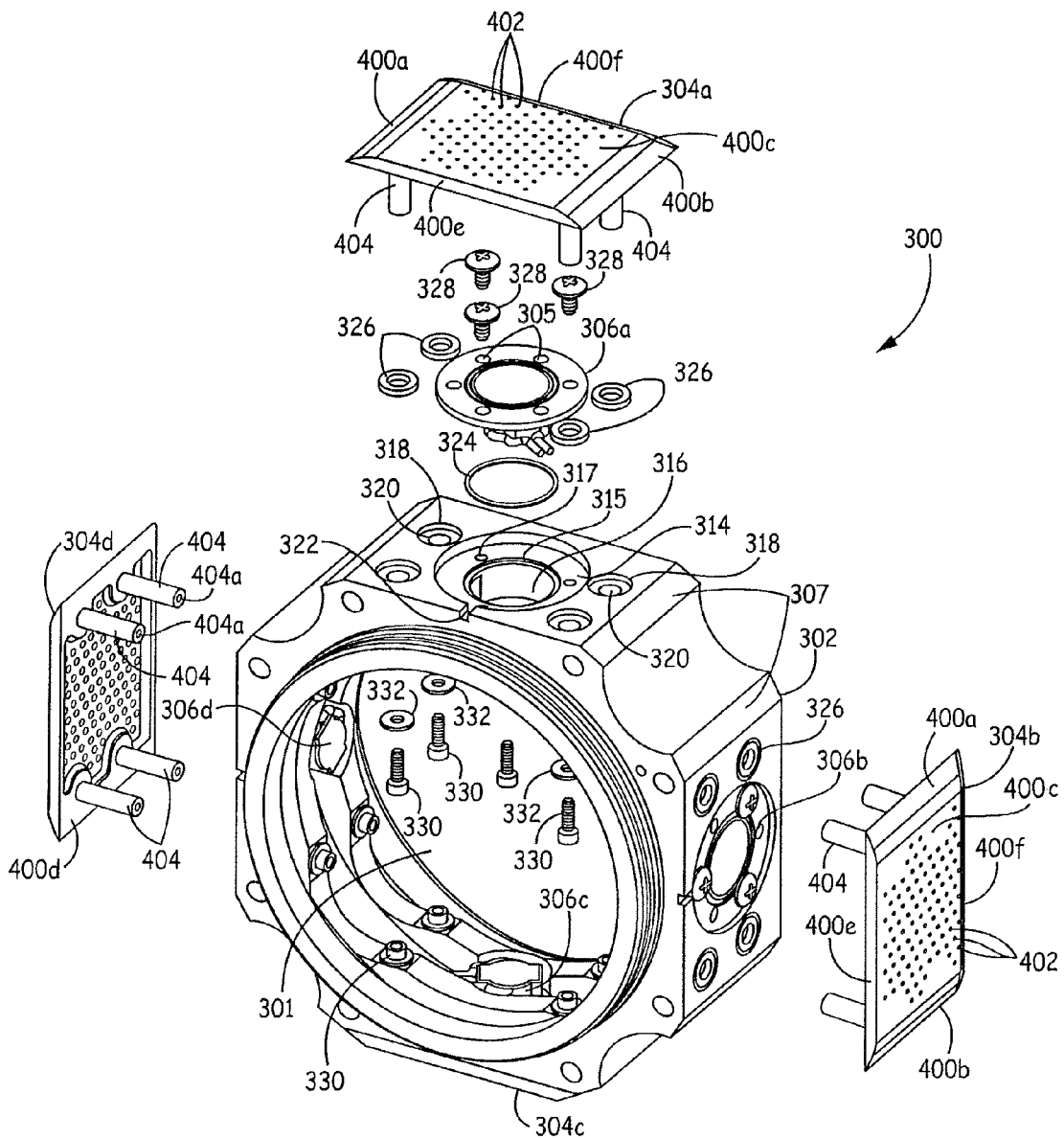
FIG. 3 is an un-assembled side perspective view of an acoustic bezel mount system of one embodiment of the present disclosure.

Referring to FIG. 3, an unassembled side perspective view of an acoustic bezel mount system 300 of one embodiment is illustrated. The acoustic bezel mount system 300 includes the bezel spacer 302. Mounted to the bezel spacer 302 in this embodiment are four microphones 306a, 306b, 306c, and 306d that make up the acoustic array 106, as illustrated in FIG. 1. The microphones 306a, 306b, 306c, and 306d are mounted so that adjacent microphones are oriented 90 degrees from each other. Stated another way, opposing microphones 306a and 306c and opposing microphones 306b and 306d are positioned 180 degrees with respect to each other. In this configuration, signals provided by the microphones 306a, 306b, 306c, and 306d can be analyzed by the controller 114, as illustrated in FIG. 1, to determine if there is a threat to a vehicle. The outer surface of each side of the bezel spacer 302 that includes the microphones 306a, 306b, 306c, and 306d, includes a microphone aperture 316 and a respective counter sunk microphone portion 314 in which a respective microphone 306a, 306b, 306c, and 306d is mounted. Each microphone 306a, 306b, 306c, and 306d includes a plurality of mounting apertures 305 that is aligned with threaded apertures 317 in the respective counter sunk microphone portions 314. Each counter sunk microphone portion 314 further includes a groove 315 that is adjacent to an opening to the microphone aperture 316. A microphone O-ring 324 is received in each groove 315 to seal the central bezel passage 301 of the bezel spacer 302 from moisture and debris. A plurality of threaded fasteners 328 passing the mounting apertures 305 in respective microphones 306a, 306b, 306c, and 306d and threadably engaging the threaded apertures 317 in the respective counter sunk microphone portion 314, couple the respective microphones 306a, 306b, 306c, and 306d to the bezel spacer 302. Also illustrated in FIG. 3, is a cavity drain 322 that provides a passage between respective counter sunk microphone portions 314 to an edge of the bezel spacer 302.

Each microphone 306a, 306b, 306c, and 306d is covered by a respective windscreen 304a, 304b, 304c, and 304d. Each windscreen 304a, 304b, 304c, and 304d includes a first end edge 400a, an opposed, second end edge 400b, a front end edge 400e, and a back end edge 400f. In some embodiments, edges 400a, 400b, and 400e are beveled. Each windscreen 304a, 304b, 304c, and 304d further includes an upper surface 400c, and a lower surface 400d. Pluralities of signal passages 402 extend all the way through each windscreen 304a, 304b, 304c, and 304d from the upper surface 400c to the lower surface 400d. The signal passages 402 allow audio signals to pass through the windscreens 304a, 304b, 304c, and 304d to respective microphones 306a, 306b, 306c, and 306d. A plurality of posts 404 extends from the bottom surface 400d from each windscreen 304a, 304b, 304c, and 304d. A threaded bore 404a is formed in an end of each of the posts 404. A plurality of windscreen apertures 320 with associated windscreen counter sunk portions 318 passes though the bezel spacer 302 proximate associated microphone passages 316. Windscreen O-rings 326 are received in respective counter sunk portions 318. The posts 404 of each windscreen 304a, 304b, 304c, and 304d are then received in respective windscreen apertures 320 of the bezel spacer 302. Fasteners 330, with washers 332 positioned within a central bezel passage 301 of the bezel spacer 302 threadably engage respective threaded bores 404a in the ends of each post 404 to couple each windscreen 304a, 304b, 304c, and 304d to the bezel spacer 302 over each respective microphone 306a, 306b, 306c, and 306d. The windscreen O-rings 326 seal the windscreen apertures 320 to prevent moisture and debris from entering the central bezel passage 301 of the bezel spacer 302.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present disclosure. Therefore, it is manifestly intended that this invention be limited only by the claims and the equivalents thereof.

What is claimed is:

1. A multi-spectral detection device comprising:
   a sensor housing having a front end, a back end, and an inner chamber;
   at least one electro-optical sensor having sensor components housed within the inner chamber of the sensor housing;
   a bezel spacer coupled to the front end of the sensor housing; and
   an acoustic array coupled to the bezel spacer, wherein the acoustic array includes at least one microphone coupled to at least one side wall of the bezel spacer such that the acoustic array has 360 degrees of total acoustic coverage around the multi-spectral detection device.

2. The multi-spectral detection device of claim 1, wherein the at least one microphone includes at least one pair of opposing microphones positioned 180 degrees away from each other on opposing side walls of the bezel spacer.

3. The multi-spectral detection device of claim 1, wherein the at least one microphone includes:
   a first microphone coupled to a first side wall of the bezel spacer;
   a second microphone coupled to a second side wall of the bezel spacer;
   a third microphone coupled to a third side wall of the bezel spacer; and
   a fourth microphone coupled to a fourth side wall of the bezel spacer, wherein the first microphone, the second microphone, the third microphone, and the fourth microphone each face away from its respective adjacent microphones of the acoustic array by 90 degrees.

4. The multi-spectral detection device of claim 1, wherein the bezel spacer includes a central bezel passage leading to the inner chamber of the sensor housing.

5. The multi-spectral detection device of claim 1, further comprising an end cap coupled to an end of the bezel spacer opposite the front end of the sensor housing.

6. The multi-spectral detection device of claim 5, wherein the at least one electro-optical sensor is mounted to the end cap.

7. The multi-spectral detection device of claim 6, wherein the sensor components include cables passing through central apertures of the bezel spacer and the sensor housing to a back passage on the back end of the sensor housing.

8. The multi-spectral detection device of claim 1, further comprising at least one windscreen coupled to the bezel spacer covering the at least one microphone.

9. The multi-spectral detection device of claim 1, wherein the at least one electro-optical sensor includes at least one of an ultraviolet sensor, a visible-near infrared sensor, or a mid-wave infrared sensor.

10. The multi-spectral detection device of claim 1, wherein the bezel spacer further includes a microphone aperture and a respective counter sunk microphone portion in which the at least one microphone is mounted.

11. The multi-spectral detection device of claim 10, wherein the bezel spacer further includes an O-ring located within the counter sunk microphone portion to seal the microphone aperture from moisture.

12. A protection system including:
    a multi-spectral detection device comprising:
       a sensor housing having a front end, a back end, and an inner chamber housing sensor components of at least one electro-optical sensor;
       a bezel spacer coupled to the front end of the sensor housing; and
       at least one microphone of an acoustic array coupled to at least one side wall of the bezel spacer such that the acoustic array has 360 degrees of total acoustic coverage around the multi-spectral detection device;
    an alarm system; and
    a controller operably coupled with the multi-spectral detection device and the alarm system, and configured to:
       determine a threat based, at least in part, on signals received from the at least one electro-optical sensor and the acoustic array; and
       activate the alarm system responsive to the threat being determined.

13. The protection system of claim 12, wherein the controller is configured to determine direction of arrival of the threat based, at least in part, on the signals received from the acoustic array.

14. The protection system of claim 12, wherein the controller is configured to determine a geolocation of the threat based, at least in part, on the signals received from the acoustic array.

15. The protection system of claim 12, further comprising an object to which the multi-spectral detection device is coupled for protection.

16. The protection system of claim 15, wherein the object is a vehicle.

17. The protection system of claim 16, wherein the vehicle is an aircraft.

18. A method of operating a threat protection system for an object, the method comprising:
    receiving signals from at least one electro-optical sensor housed within a multi-spectral detection device;
    receiving acoustic signals from an acoustic array having at least one microphone coupled to an outer surface of a bezel spacer coupled to a sensor housing for the multi-spectral detection device, the acoustic array having a 360 degree coverage range around the multi-spectral detection device;
    determining a threat based in part, on the signals from the at least one electro-optical sensor and the acoustic signals from the acoustic array; and
    activating an alarm system responsive to determining the threat.

19. A method of forming a multi-spectral detection system, the method comprising:
    coupling at least one electro-optical sensor to a sensor housing having an inner chamber such that sensor components of the at least one electro-optical sensor are housed within the inner chamber;
    coupling a bezel spacer to a front end of the sensor housing; and
    coupling at least one acoustic array to an outer surface of the bezel spacer, the at least one acoustic array having a 360 degree coverage range around the multi-spectral detection system.

20. The method of claim 19, wherein coupling the at least one acoustic array to the outer surface of the bezel spacer includes:
    coupling a first microphone to a first side wall of the bezel spacer;

coupling a second microphone to a second side wall of the bezel spacer facing away from the first microphone by 90 degrees;
coupling a third microphone to a third side wall of the bezel spacer facing away from the second microphone by 90 degrees; and
coupling a fourth microphone to a fourth side wall of the bezel spacer facing away from the third microphone by 90 degrees.

* * * * *